(12) United States Patent
Davies

(10) Patent No.: US 7,803,281 B2
(45) Date of Patent: Sep. 28, 2010

(54) SELECTIVE BONDING FOR FORMING A MICROVALVE

(75) Inventor: Brady Reuben Davies, Bellingham, WA (US)

(73) Assignee: Microstaq, Inc., Austin, TX (US)

( * ) Notice: Subject to any disclaimer, the term of this patent is extended or adjusted under 35 U.S.C. 154(b) by 300 days.

(21) Appl. No.: 10/590,954

(22) PCT Filed: Feb. 15, 2005

(86) PCT No.: PCT/US2005/004821

§ 371 (c)(1),
(2), (4) Date: May 4, 2007

(87) PCT Pub. No.: WO2005/091820

PCT Pub. Date: Oct. 6, 2005

(65) Prior Publication Data

US 2007/0289941 A1    Dec. 20, 2007

Related U.S. Application Data

(60) Provisional application No. 60/550,653, filed on Mar. 5, 2004.

(51) Int. Cl.
*C03C 15/00* (2006.01)
(52) U.S. Cl. ............... 216/33; 216/34; 216/35
(58) Field of Classification Search ............ 216/33, 216/34, 35, 43, 67, 79
See application file for complete search history.

(56) References Cited

U.S. PATENT DOCUMENTS

| | | | |
|---|---|---|---|
| 0,886,045 A | 4/1908 | Ehrlich et al. | |
| 1,886,205 A | 11/1932 | Lyford | |
| 1,926,031 A | 9/1933 | Boynton | |
| 2,412,205 A | 12/1946 | Cook | |
| 2,504,055 A | 4/1950 | Thomas | |
| 2,840,107 A | 6/1958 | Campbell | |
| 2,875,779 A | 3/1959 | Campbell | |

(Continued)

FOREIGN PATENT DOCUMENTS

DE    2215526    10/1973

(Continued)

OTHER PUBLICATIONS

"A Silicon Microvalve for the Proportional Control of Fluids" by K.R. Williams, N.I. Maluf, E.N. Fuller, R.J. Barron, D.P. Jaeggi, and B.P. van Drieënhuizen, Transducers '99, Proc. 10th International Conference on Solid State Sensors and Actuators, held Jun. 7-10, 1999, Sendai, Japan, pp. 18-21.

(Continued)

*Primary Examiner*—Lan Vinh
(74) *Attorney, Agent, or Firm*—MacMillan, Sobanski & Todd, LLC

(57) ABSTRACT

A method for forming a micromachined device is disclosed that includes providing a first silicon layer and a second silicon layer. A coating is provided on a first portion of the first layer. The first layer and the second layer are bonded to each other to form a micromachined device, the coating being effective to prevent the coated first portion of the first layer from bonding to the second layer.

25 Claims, 12 Drawing Sheets

U.S. PATENT DOCUMENTS

| | | | |
|---|---|---|---|
| 3,031,747 A | 5/1962 | Green | |
| 3,729,807 A | 5/1973 | Fujiwara | |
| 3,747,628 A | 7/1973 | Holster et al. | |
| 3,860,949 A | 1/1975 | Stoeckert et al. | |
| 4,005,454 A | 1/1977 | Froloff et al. | |
| 4,019,388 A | 4/1977 | Hall II et al. | |
| 4,023,725 A | 5/1977 | Ivett et al. | |
| 4,152,540 A | 5/1979 | Duncan et al. | |
| 4,181,249 A | 1/1980 | Peterson et al. | |
| 4,298,023 A | 11/1981 | McGinnis | |
| 4,341,816 A | 7/1982 | Lauterbach et al. | |
| 4,434,813 A | 3/1984 | Mon | |
| 4,476,893 A | 10/1984 | Schwelm | |
| 4,581,624 A | 4/1986 | O'Connor | |
| 4,593,719 A | 6/1986 | Leonard | |
| 4,628,576 A | 12/1986 | Giachino et al. | |
| 4,647,013 A | 3/1987 | Giachino et al. | |
| 4,661,835 A | 4/1987 | Gademann et al. | |
| 4,772,935 A | 9/1988 | Lawler et al. | |
| 4,821,997 A | 4/1989 | Zdeblick | |
| 4,824,073 A | 4/1989 | Zdeblick | |
| 4,826,131 A | 5/1989 | Mikkor | |
| 4,828,184 A | 5/1989 | Gardner et al. | |
| 4,869,282 A | 9/1989 | Sittler et al. | |
| 4,938,742 A | 7/1990 | Smits | |
| 4,943,032 A | 7/1990 | Zdeblick | |
| 4,946,350 A | 8/1990 | Suzuki et al. | |
| 4,959,581 A | 9/1990 | Dantlgraber | |
| 4,966,646 A | 10/1990 | Zdeblick | |
| 5,029,805 A | 7/1991 | Albarda et al. | |
| 5,037,778 A | 8/1991 | Stark et al. | |
| 5,050,838 A | 9/1991 | Beatty et al. | |
| 5,054,522 A | 10/1991 | Kowanz et al. | |
| 5,058,856 A | 10/1991 | Gordon et al. | |
| 5,061,914 A | 10/1991 | Busch et al. | |
| 5,064,165 A | 11/1991 | Jerman | |
| 5,065,978 A | 11/1991 | Albarda et al. | |
| 5,066,533 A | 11/1991 | America et al. | |
| 5,069,419 A | 12/1991 | Jerman | |
| 5,074,629 A | 12/1991 | Zdeblick | |
| 5,082,242 A | 1/1992 | Bonne et al. | |
| 5,096,643 A | 3/1992 | Kowanz et al. | |
| 5,116,457 A | 5/1992 | Jerman | |
| 5,131,729 A | 7/1992 | Wetzel | |
| 5,133,379 A | 7/1992 | Jacobsen et al. | |
| 5,142,781 A | 9/1992 | Mettner et al. | |
| 5,161,774 A | 11/1992 | Engelsdorf et al. | |
| 5,169,472 A | 12/1992 | Goebel | |
| 5,176,358 A | 1/1993 | Bonne et al. | |
| 5,177,579 A | 1/1993 | Jerman | |
| 5,178,190 A | 1/1993 | Mettner | |
| 5,179,499 A | 1/1993 | MacDonald et al. | |
| 5,180,623 A | 1/1993 | Ohnstein | |
| 5,197,517 A | 3/1993 | Perera | |
| 5,209,118 A | 5/1993 | Jerman | |
| 5,215,244 A | 6/1993 | Buchholz et al. | |
| 5,216,273 A | 6/1993 | Doering et al. | |
| 5,217,283 A | 6/1993 | Watanabe | |
| 5,222,521 A | 6/1993 | Kihlberg | |
| 5,238,223 A | 8/1993 | Mettner et al. | |
| 5,244,537 A | 9/1993 | Ohnstein | |
| 5,267,589 A | 12/1993 | Watanabe | |
| 5,271,431 A | 12/1993 | Mettner et al. | |
| 5,271,597 A | 12/1993 | Jerman | |
| 5,309,943 A | 5/1994 | Stevenson et al. | |
| 5,323,999 A | 6/1994 | Bonne et al. | |
| 5,325,880 A | 7/1994 | Johnson et al. | |
| 5,333,831 A | 8/1994 | Barth et al. | |
| 5,336,062 A | 8/1994 | Richter | |
| 5,355,712 A | 10/1994 | Petersen et al. | |
| 5,368,704 A | 11/1994 | Madou et al. | |
| 5,375,919 A | 12/1994 | Furuhashi | |
| 5,400,824 A | 3/1995 | Gschwendtner et al. | |
| 5,417,235 A | 5/1995 | Wise et al. | |
| 5,445,185 A | 8/1995 | Watanabe et al. | |
| 5,458,405 A | 10/1995 | Watanabe | |
| 5,543,349 A * | 8/1996 | Kurtz et al. | 438/51 |
| 5,553,790 A | 9/1996 | Findler et al. | |
| 5,566,703 A | 10/1996 | Watanabe et al. | |
| 5,577,533 A | 11/1996 | Cook, Jr. | |
| 5,611,214 A | 3/1997 | Wegeng et al. | |
| 5,785,295 A | 7/1998 | Tsai | |
| 5,810,325 A | 9/1998 | Carr | |
| 5,838,351 A | 11/1998 | Weber | |
| 5,848,605 A | 12/1998 | Bailey et al. | |
| 5,856,705 A * | 1/1999 | Ting | 257/758 |
| 5,873,385 A | 2/1999 | Bloom et al. | |
| 5,909,078 A | 6/1999 | Wood et al. | |
| 5,926,955 A | 7/1999 | Kober | |
| 5,941,608 A | 8/1999 | Campau et al. | |
| 5,954,079 A | 9/1999 | Barth et al. | |
| 5,955,817 A | 9/1999 | Dhuler et al. | |
| 5,970,998 A | 10/1999 | Talbot et al. | |
| 5,994,816 A | 11/1999 | Dhuler et al. | |
| 6,019,437 A | 2/2000 | Barron et al. | |
| 6,023,121 A | 2/2000 | Dhuler et al. | |
| 6,038,928 A | 3/2000 | Maluf et al. | |
| 6,096,149 A | 8/2000 | Hetrick et al. | |
| 6,105,737 A | 8/2000 | Weigert et al. | |
| 6,114,794 A | 9/2000 | Dhuler et al. | |
| 6,116,863 A | 9/2000 | Ahn et al. | |
| 6,124,663 A | 9/2000 | Haake et al. | |
| 6,171,972 B1 | 1/2001 | Mehregany et al. | |
| 6,224,445 B1 * | 5/2001 | Neukermans et al. | 445/1 |
| 6,255,757 B1 | 7/2001 | Dhuler et al. | |
| 6,279,606 B1 | 8/2001 | Hunnicutt et al. | |
| 6,386,507 B2 | 5/2002 | Dhuler et al. | |
| 6,390,782 B1 | 5/2002 | Booth et al. | |
| 6,494,804 B1 | 12/2002 | Hunnicutt et al. | |
| 6,505,811 B1 | 1/2003 | Barron et al. | |
| 6,523,560 B1 | 2/2003 | Williams et al. | |
| 6,533,366 B1 | 3/2003 | Barron et al. | |
| 6,540,203 B1 | 4/2003 | Hunnicutt | |
| 6,581,640 B1 | 6/2003 | Barron | |
| 6,637,722 B2 | 10/2003 | Hunnicutt | |
| 6,662,581 B2 | 12/2003 | Hirota et al. | |
| 6,694,998 B1 | 2/2004 | Hunnicutt | |
| 6,724,718 B1 * | 4/2004 | Shinohara et al. | 369/300 |
| 6,761,420 B2 | 7/2004 | Maluf et al. | |
| 6,845,962 B1 | 1/2005 | Barron et al. | |
| 6,958,255 B2 * | 10/2005 | Khuri-Yakub et al. | 438/48 |
| 7,011,378 B2 | 3/2006 | Maluf et al. | |
| 2002/0096421 A1 * | 7/2002 | Cohn et al. | 200/181 |
| 2002/0174891 A1 | 11/2002 | Maluf et al. | |
| 2003/0061889 A1 * | 4/2003 | Tadigadapa et al. | 73/861.355 |
| 2003/0092526 A1 | 5/2003 | Hunnicutt et al. | |
| 2003/0098612 A1 | 5/2003 | Maluf et al. | |
| 2006/0218953 A1 | 10/2006 | Hirota | |
| 2006/0243331 A1 | 11/2006 | Fuller et al. | |

FOREIGN PATENT DOCUMENTS

| | | |
|---|---|---|
| DE | 2930779 | 2/1980 |
| DE | 3401404 | 7/1985 |
| DE | 4101575 | 7/1992 |
| DE | 4417251 | 11/1995 |
| DE | 4422942 | 1/1996 |
| EP | 250948 | 1/1988 |
| EP | 261972 | 3/1988 |
| EP | 1024285 A2 | 8/2000 |
| GB | 2238267 | 5/1991 |
| WO | WO 99/16096 | 4/1999 |
| WO | 9924783 | 5/1999 |
| WO | WO 00/14415 | 3/2000 |

| | | | |
|---|---|---|---|
| WO | 05084211 | A2 | 9/2005 |
| WO | 2005091820 | A2 | 10/2005 |

OTHER PUBLICATIONS

"Process for in-plane and out-of-plane single-crystal-silicon thermal microactuators"; J. Mark Noworolski, et al.; Sensors and Actuators A 55 (1996); pp. 65-69.

Ayón et al., "Etching Characteristics and Profile Control in a Time Multiplexed ICP Etcher," Proc. Of Solid State Sensor and Actuator Workshop Technical Digest, Hilton Head SC, (Jun. 1998) 41-44.

Bartha et al., "Low Temperature Etching of Si in High Density Plasma Using SF6/O2," Microelectronic Engineering, Elsevier Science B.V., vol. 27, (1995) 453-456.

Fung et al., "Deep Etching of Silicon Using Plasma" Proc. Of the Workshop on Micromachining and Micropackaging of Transducers, (Nov. 7-8, 1984) pp. 159-164.

IEEE Technical Digest entitled "Compliant Electro-thermal Microactuators", J. Jonsmann, O. Sigmund, S. Bouwstra, Twelfth IEEE International Conference on Micro Electro Mechanical Systems held Jan. 17-21, 1999, Orlando, Florida, pp. 588-593, IEEE Catalog Number: 99CH36291C.

Klaassen et al., "Silicon Fusion Bonding and Deep Reactive Ion Etching; A New Technology for Microstructures," Proc., Transducers 95 Stockholm Sweden, (1995) 556-559.

Linder et al., "Deep Dry Etching Techniques as a New IC Compatible Tool for Silicon Micromachining," Proc,. Transducers, vol. 91, (Jun. 1991) pp. 524-527.

Petersen et al. "Surfaced Micromachined Structures Fabricated with Silicon Fusion Bonding" Proc., Transducers 91, (Jun. 1992) pp. 397-399.

Yunkin et al., "Highly Anisotropic Selective Reactive Ion Etching of Deep Trenches in Silicon," Microelectronic Enginineering, Elsevier Science B.V., vol. 23, (1994) pp. 373-376.

PCT International Search Report and Written Opinion for International application No. PCT/US05/004821, filed Feb. 15, 2005.

Office Action dated Apr. 10, 2009, in corresponding foreign patent application (Chinese Patent Application No. 200580011090.3, which is a national stage application based on International application No. PCT/US05/004821, filed Feb. 15, 2005).

* cited by examiner

SELECTIVE BONDING FOR FORMING A MICROVALVE

CROSS-REFERENCE TO RELATED APPLICATIONS

This application is the U.S. national phase of International Application No. PCT/US2005/004821, filed Feb. 15, 2005, which claims priority from U.S. Patent Application No. 60/550,653, filed Mar. 5, 2004. The disclosures of both applications are incorporated herein by reference.

The present invention relates in general to control valves and to semiconductor electromechanical devices, and in particular, to a method of forming a micromachined control valve.

MEMS (MicroElectroMechanical Systems) is a class of systems that are physically small, having features with sizes in the micrometer range. These systems have both electrical and mechanical components. The term "micromachining" is commonly understood to mean the production of three-dimensional structures and moving parts of MEMS devices. MEMS originally used modified integrated circuit (computer chip) fabrication techniques (such as chemical etching) and materials (such as silicon semiconductor material) to micromachine these very small mechanical devices. Today there are many more micromachining techniques and materials available. The term "microvalve" as used in this application means a valve having features with sizes in the micrometer range, and thus by definition is at least partially formed by micromachining. The term "microvalve device" as used in this application means a device that includes a microvalve, and that may include other components. It should be noted that if components other than a microvalve are included in the microvalve device, these other components may be micromachined components or standard sized (larger) components.

Various microvalve devices have been proposed for controlling fluid flow within a fluid circuit. A typical microvalve device includes a displaceable member or valve movably supported by a body and operatively coupled to an actuator for movement between a closed position and a fully open position. When placed in the closed position, the valve blocks or closes a first fluid port that is placed in fluid communication with a second fluid port, thereby preventing fluid from flowing freely between the fluid ports. When the valve moves from the closed position to the fully open position, fluid is increasingly allowed to flow between the fluid ports. U.S. Patent Publication US2003/0098612A1, issued as U.S. Pat. No. 6,761,420 to Maluf et al., the disclosures of which are hereby incorporated herein by reference in their entirety, discloses a microvalve device having first, second, and third layers. The second layer is bonded between the first and third layers and forms a cavity between the layers with a displaceable member (valve) therein. U.S. Pat. No. 6,540,203, entitled "Pilot Operated Microvalve Device", the disclosures of which are hereby incorporated herein by reference in their entirety, describes a microvalve device consisting of an electrically operated pilot microvalve and a pilot operated microvalve which position is controlled by the pilot microvalve. U.S. Pat. No. 6,494,804, entitled "Microvalve for Electronically Controlled Transmission", the disclosures of which are hereby incorporated herein by reference in their entirety, describes a microvalve device for controlling fluid flow in a fluid circuit, and includes the use of a fluid bleed path through an orifice to form a pressure divider circuit.

In addition to generating a force sufficient to move the displaced member, the actuator must generate a force capable of overcoming the fluid flow forces acting on the displaceable member that oppose the intended displacement of the displaced member. These fluid flow forces generally increase as the flow rate through the fluid ports increases.

One method of fabrication of a microvalve involves fusion bonding, such as silicon fusion bonding, and deep reactive ion etching (DRIE). Wafer bonding allows the bonding of one silicon layer to another to form one single mechanical structure. One type of wafer bonding process, fusion bonding, has been demonstrated to be at the molecular level and provides very high mechanical robustness. Fusion bonding techniques are well known. See, for example, K.E. Petersen, D. Gee, F. Pourahmadi, J. Brown and L. Christel, "Surface Micromachined Structures Fabricated with Silicon Fusion Bonding," Proceedings, Transducers 91, June 1992, at pp. 397-399, the disclosures of which are expressly incorporated herein by reference in their entirety. Other exemplary types of wafer bonding including anodic bonding, solder bonding, adhesive bonding, are also applicable to the selective bonding process described in this document.

Although several methods of forming microvalves have been used in the past, it would be beneficial to devise an improved method that reduces the cost and increases the ease of manufacture of the microvalve devices.

SUMMARY OF THE INVENTION

The present invention relates to a method of selectively bonding a plurality of layers. The method includes providing a first layer and a second layer. A portion of at least one of the first layer and the second layer is coated with a coating material. The first layer and second layer are then bonded to each other. The coating prevents the coated portion from bonding with the opposed portion of the other layer that was not coated when the coated and uncoated portions are positioned adjacent each other.

The method can also include providing a first silicon layer and a second silicon layer. A portion of the second silicon layer is etched to form a slider portion and a layer portion. The slider portion is movable relative to the layer portion. A portion of the first silicon layer is coated with a coating material. The coated portion has a size and shape that corresponds to the size and shape of the slider portion. The first silicon layer is positioned over the second silicon layer such that the coated portion of the first silicon layer is substantially aligned with the slider portion of the second silicon layer. Finally, a bonding operation is performed to bond the first silicon layer to the second silicon layer. During the bonding operation, the layer portion of the second silicon layer bonds to the first silicon layer, while the coating material separates the slider portion from the first silicon layer to prevent the slider portion from bonding with the first layer.

Various objects and advantages of this invention will become apparent to those skilled in the art from the following detailed description, when read in light of the accompanying drawings.

DETAILED DESCRIPTION OF THE PREFERRED EMBODIMENTS

Figure 1:
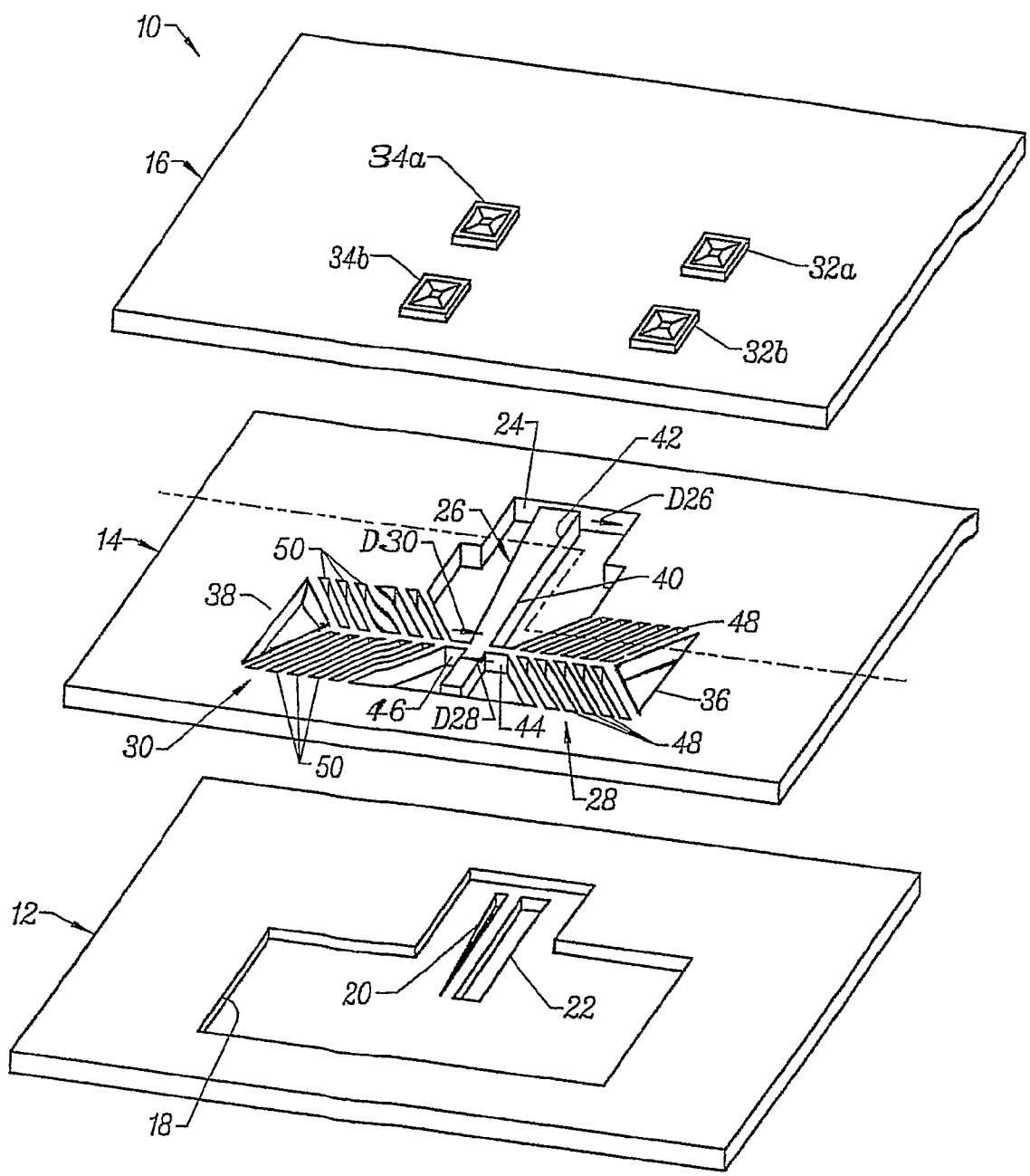
FIG. 1 is an exploded perspective view of first, second and third layers of a microvalve assembly to be fabricated according to the present invention.

Several types of micromachined devices are known in the art. Many of these devices are formed having a plurality of layer& bonded together. Referring now to the drawings, there is illustrated in FIG. 1 an exploded view of a microvalve, indicated generally at 10, that can be formed according to the present invention. The microvalve 10 generally comprises three layers or substrates: a first layer 12, a second layer 14 and a third layer 16. The first layer 12 defines an inlet port 20 and an outlet port 22. The second layer 14 is secured between the first layer 12 and the third layer 16, and defines a cavity 24 including a flow area to permit fluid flow between the inlet port 20 and the outlet port 22. The second layer 14 further defines a displaceable member 26 which can be displaced in response to thermal actuators 28, 30 to open and close the inlet port 20. In the illustrated embodiment, the displaceable member 26 is elongated. Electrical contacts 32a, 32b, 34a and 34b for electrical thermal heating of the actuators 28, 30, respectively are provided in vies through the third or cap layer 16.

When an input such as current is applied through each of the actuators 28, 30 via the electrical contacts 32a-b, 34a-b, each of the actuators 28, 30 exerts a force in a direction indicated by arrows D28 and D30, respectively. Forces in the directions indicated by the arrows D28 and D30 cause the displaceable member 26 to be displaced in a direction indicated by the arrow D26 such that at least a portion of the displaceable member 26 becomes vertically aligned with the inlet port 20. The current, therefore, serves as an input stimulus which actuates the actuators 28, 30. The at least partial vertical alignment of the displaceable member 26 relative to the inlet port 20 at least partially closes the inlet port 20. The amount of displacement or alignment of the displaceable member 26 may be selected to control, for example, the rate of fluid flow through the microvalve 10 from the inlet port 20 to the outlet port 22. When the input is no longer applied through the actuators 28, 30, the actuators 28, 30 exert forces in directions opposed those indicated by the arrows D28 and D30, respectively, to return the displaceable member 26 to its normally open position relative to the inlet port 20 by displacing the displaceable member 26 in a direction opposite to that indicated by the arrow D26.

Alternatively, the microvalve 10 may be configured such that the displaceable member 26 is in a normally closed position relative to the inlet port 20 and is displaceable to open the inlet port 20. In another alternative embodiment, the microvalve 10 may be configured such that the displaceable member 26 is in a normally open or closed position relative to the outlet port 22 and is displaceable to close or open the outlet port 22.

Preferably, each of the first, second, and third layers 12, 14, 16 is made of silicon or other semiconductor materials. Alternatively, the first and/or the third layers 12, 16 may be made of glass (Pyrex), nonconductive ceramic, or any other nonconductive material. The second layer 14 is preferably a doped single-crystal semiconductor (SCS) as it is strong, flexible, and more resistant to performance degradation, but could be made of any conductive material.

Although the microvalve 10 is generally described herein as opening and closing the inlet port 20, such a description is solely for illustrative purposes only and clearly, the microvalve 10 can be easily adapted to open or close the outlet post 22. Further, although the microvalve 10 is described herein as a normally open (N.O.) valve, the microvalve 10 can be easily adapted to be a normally closed (N.C.) valve. In addition, for purposes of clarity and brevity of the description herein, only the actuator 28 and the corresponding electrical contacts 32a-b will generally be described, although the description is correspondingly applicable to the actuator 30 and the electrical contacts 34a-b.

The first and third layers 12, 16 define shallow recesses 18, although only a recess 18 in the first layer 12 is shown in FIG. 1. The recesses 18 are defined in regions aligned with the displaceable member 26 and the actuators 28, 30 of the second layer 14 to provide clearance for suspension of the displace able member 26 and the actuators 28, 30 between the first and third layers 12, 16 and for the displacement thereof within the cavity 24 in the plane of the second layer 14. The recesses 18 may also be defined in regions aligned with the cavity 24 to further facilitate fluid flow through the cavity 24. Alternatively or additionally, the displaceable member 26 and the actuators 28, 30 of the second layer 14 may be indented, or thinned, from the first and third layers 12, 16 to provide clearance therebetween. In addition, the recesses 18 and indents may provide a clearance of approximately 0.5 µm in the region near the inlet 20 between the displaceable member 26 and each of the first and third layer 12, 16 in order to minimize fluid leakage by reducing the distance between the displaceable member 26 and the inlet port 20 when the displaceable member 26 is aligned over the inlet port 20 to close off the fluid flow. In addition, the recesses 18 and indents may provide a clearance of approximately 1 µm or less in other regions such as those between the actuators 28, 30 and each of the first and third layers 12, 16 in order to minimize fluid or gas pressure differential.

The electrical contacts 32a-b are provided in the third layer 16 and are vertically aligned with the thermal actuator 28. The electrical contacts 32a-b provide electrical contact, through vias, for the application of current to the actuators 28. The ribs 48 serve as conductive paths through the second layer 14 between the contacts 32a-b. The contacts 32a-b are preferably in electrical contact with regions of the second layer 14 that are isolated except for current conduction paths formed by the ribs 48. Such electrical isolation may be established by providing trenches 36 in the second layer 14 to prevent a short circuit between the electrical contacts 32a-b.

The displaceable member 26 has a first actuator end portion 40 in contact with thermal actuators 28, 30 and a second stopper end portion 42 disposed and shaped for opening and closing the inlet port 20. The displaceable member 26 increases in cross-sectional area from the first actuator end portion 40 to the stopper end portion 42. The larger cross-sectional area at the second stopper end portion 42 maximizes the ability of the displaceable member 26 to withstand differential fluid pressures. Applying a current through the ribs 48 causes them to thermally expand which in turn causes the shaft 44 to exert a force on the displaceable member 26 in a direction indicated by the arrow D28.

The actuation of the microvalve 10 also is substantially similar to the actuation mechanism described in U.S. Pat. No. 6,637,722 to Hunnicutt and PCT Patent Publication WO 01/71226, the disclosures of which are incorporated herein by reference in their entirety. The components and general operation of a microvalve 10 has been described above for illustration purposes of a single embodiment of the microvalve. However, microvalves can have any desired and suitable structure or setup depending on the desired application of the microvalve 10. Additional details of the structure and operation of microvalves believed to be suitable in some applications in place of the microvalve 10 described herein can be found in the references incorporated by reference above.

Fabrication of a microvalve formed from multiple layers, such as the one illustrated in FIG. 1, may be accomplished by fusion bonding, such as silicon fusion bonding, and deep reactive ion etching (DRIE). Fusion bonding allows the bonding of one silicon layer to another to form one single mechanical structure. The fusion bond has been demonstrated to be at the molecular level and provides very high mechanical robustness. Fusion bonding techniques are well known. See, for example, K.E. Petersen, D. Gee, F. Pouralmadi, J. Brown and L. Christel, "Surface Micromachined Structures Fabricated with Silicon Fusion Bonding," *Proceedings, Transducers* 91, June 1992, at pp. 397-399, which is expressly incorporated herein by reference in its entirety.

The process for fabricating a microstructure in accordance with a preferred embodiment of the invention is explained with reference to FIGS. 2A-2F. The current embodiment employs three silicon layers or wafers (e.g., 12', 14', and 16'). Using three silicon layers, the process results in the formation of a prescribed single-crystal silicon structure (SCS) microstructure as an integral portion of the second layer, corresponding to the second layer 14'. The first and third layers 12', 16' serve as carriers for the second layer 14'. Alternatively, the carriers can be formed of glass (Pyrex), for example, or any other suitable material including, without limitation, any suitable crystalline, metallic, or ceramic material. It will be understood, of course, that although the following discussion only refers to three layers 12', 14', 16', the principles can be applied to the formation of a microstructure comprising a stack of two or more layers.

Figure 2A:
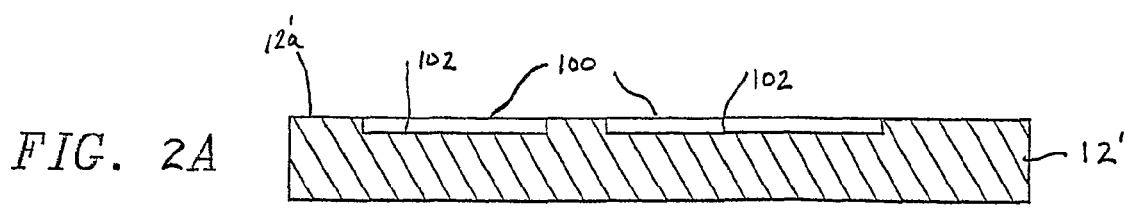
FIGS. 2A-2F illustrate a fabrication process flow of forming a microvalve according to the present invention.

In FIG. 2A, the first layer 12' is patterned with photoresists to define recessed regions 100 to be formed therein and the recessed regions 100 are formed using standard semiconductor techniques such as, for example, plasma etching, wet etching with KOH or other silicon etchants, or differential oxide growth. The recessed regions 100 can have any arbitrary geometry and can have any desired depth, from less than 0.1 µm to more than 100 µm, for example. In the current embodiment, the recessed regions 100 have a depth of approximately 1 µm.

It should be appreciated that the recessed regions 100 need not have a single uniform depth. For example, several standard silicon etch steps may be employed to produce several different depths that can be used for different mechanical functions. It should also be appreciated that, alternatively, or additionally, the second layer 14', may be indented from the first layer 12' and third layer 16' to provide clearance therebetween, as described above. Moreover, each of the first layer surface 12'*a* and third layer surface 16'*a* can be either bare silicon or it can be coated with an oxide layer. Also, the base 102 of the recessed region 100 can be either bare silicon, oxidized silicon, doped silicon, or it can be coated with any other thin film capable of withstanding subsequent layer bonding and processing temperatures.

Figure 2B:
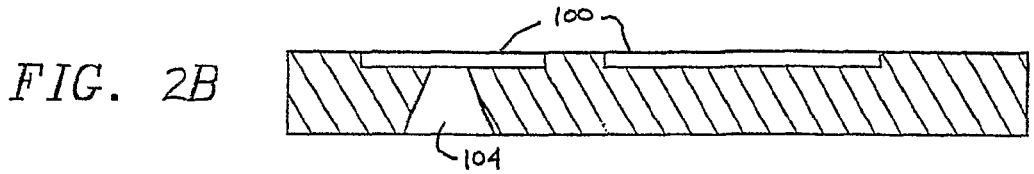

As shown in FIG. 2B, an inlet port 104 is then etched through the first layer 12'. Although not shown, the outlet port may be simultaneously etched through the first layer 12'. Alternatively or additionally, the outlet port may be etched through the third layer 16'.

Figure 2C:
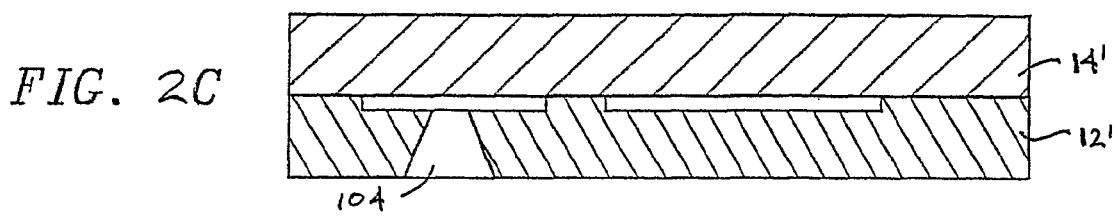

In FIG. 2C, the patterned surface of the first layer 12' is bonded to the second layer 14', preferably doped, by a silicon fusion bonding (or direct bonding) process. Fusion bonding techniques are well known. For example, refer to, K.E. Petersen, D. Gee, F. Pourahmadi, R. Craddock, J. Brown, and L. Christel, "Surface Micromachined Structures Fabricated with Silicon Fusion Bonding," *Proceedings, Transducers* 91, June 1991, at pp. 397-399, the disclosures of which are incorporated herein by reference in their entirety. In a preferred fusion bonding technique, the first layer 12' and the second layer 14' are made hydrophilic. That is the layers 12', 14' are treated with an agent such as hot nitric acid or a hot sulfuric acid and hydrogen peroxide solution or another strong oxidant, that causes water to adhere to them. After drying, the two layers 12', 14' then are paced in an oxidizing atmosphere at a temperature of 400 C-1200 C for approximately one hour.

The silicon fusion bonding technique described above bonds the first layer 12' and the second layer 14' together without the use of an intermediate glue material that could have a different coefficient of thermal expansion than the single crystal silicon layers. Furthermore, fusion bonding can be performed in which oxide or nitride layers haven been formed in the bonded surface of one or both of the layers 12', 14'.

As an alternative to fusion bonding, for example, the first and second layers 12', 14' can be adhered together with an adhesive such as a photoresist. As an alternative, the first and second layers 12' 14' can have their major surfaces coated with a metal layer, such as gold, use to alloy the layer to one another. In the event that a glass carrier is used instead of the first silicon layer 12', the second layer 14' can be anodically boded to such glass carrier.

If necessary, the second layer 14' may be thinned and polished to the thickness required by the particular application. Alternatively, electromechanical etching (ECE) can be used to thin the layer. Diffused heaters may be incorporated into a plane surface of the second layer 14' by diffusion. In addition, any necessary circuits or other thin film depositions and patterning can be performed using standard silicon processing techniques.

The second layer is then patterned for a Deep Reactive Ion Etching (DRIE) step which defines the regions of the layer to be etched. DRIE techniques have become increasingly well known. For example, refer to: A.A. Ayon, C.C. Lin, R.A. Braff, and M.A. Schmidt, "Etching Characteristics and Profile Control in a Time-Multiplexed ICP Etcher", *Proceedings of Solid State Sensor and Actuator Workshop*, Hilton Head Island, S.C., June 1998, pp. 41-44; V.A. Yunkin, D. Fischer, and E. Voges, "Highly Anoisotropic Selective Reactive Ion Etching of Deep Trenches in Silicon," *Micromechanical Engineering*, Vol. 23, 1994, at 373-376; C. Linder, T. Tschan, N.F. de Rooij, "Deep Dry Etching Techniques as a New IC Compatible Tool for Silicon Micromachining," *Proceedings, Transducers '91*, June 1991, at 524-527, C.D. Fung and J.R. Linkowski, "Deep Etching of Silicon Using Plasma," *Proceedings of the Workshop on Micromachining and Micropackaging of Transducers*, Nov. 7-8, 1984, at 150-164; and J.W. Bartha, J. Greeschner, M. Puech, and P. Maquin, "Low Temperature Etching of Si in High Density Plasma Using $SF_6/O_2$," *Microelectronic Engineering*, Vol. 27, 1995, at 453-456, the disclosures of all of which references are incorporated herein by reference in their entirety. Reactive Ion etch equipment now allows the etching of holes or trenches which are very deep (>100 microns), while maintaining high aspect ratios (the ratio between the depth of the etched region and the width of the etched region). It has been found that this equipment is capable of at least 30:1 aspect ratios for trenches as deep as 300 microns.

DRIE, in essence, involves a synergistic action between chemical etch and ion bombardment. Impinging energized ions chemically react with the silicon surface. The DRIE process advantageously etches in the vertical direction at a much higher rate than in the lateral direction (i.e. anisotropically) regardless on silicon crystal planes or crystal orientation. As a result, relatively deep substantially vertical trenches or slots, indicated generally at 106, can be formed in the single-crystal silicon (SCS) second layer 14'. These substantially vertical trenches or slots can be formed anywhere in the second layer 14' regardless of crystallographic orientation within the layer 14'. Consequently, high aspect ratio structures such as capacitive or electrostatic plates can be formed, and arbitrarily contoured structures such as circles, ellipses and spirals can be formed.

Figure 2D:
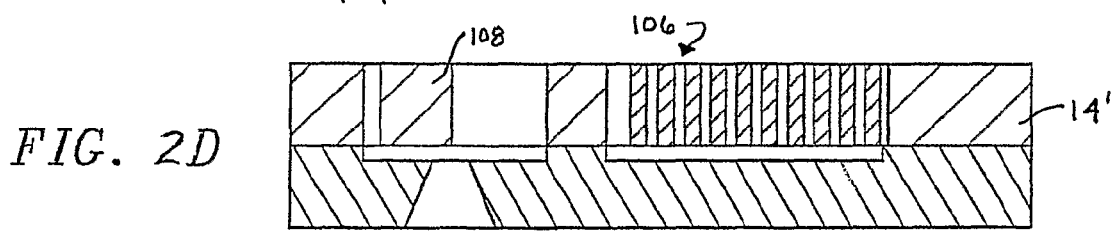

As shown in FIG. 2D, a DRIE process is used to etch completely through the second layer to define the displaceable member 108 and the actuator 106. The DRIE etching step mechanically releases the single-crystal silicon (SCS) microstructures formed in the second layer 14', which are then free to move relative to and in the plane of the second layer 14'. Suspended plate/beam structures with aspect ratios (height/width) of 20:1 or greater have been fabricated using the DRIE processes described below.

An inductively coupled plasma source etches the silicon using photoresist or silicon dioxide as a mask. Polymerization of a source gas on the sidewalls of the etched trenches 106 slows the lateral etch rate and allows high anisotropy. The etching chemical is SF6 at, for example, 50 millitorr. Oxygen additive gas and fluorinated gas available from Surface Technology Systems help provide high Si/photoreists etch rate ratios. A six micron photoresist can serve as a patterning mask. The photoresist selectivity is approximately 50:1, which makes it possible to etch depths of 300 μm with about 6 μm of resist. The RIE system can be employed to perform inductively coupled plasma DRIE, and is available from Surface Technology Systems (STS) which has a place of business in Redwood City, Calif., or from Unaxis USA, Inc. in St. Petersburg, Fla.

The combination of wafer bonding and DRIE allows the construction of three-dimensional structures from the layers 12', 14' and 16', such as the microvalve 10' of the present invention. See, for example, E.H. Klaassen, K. Petersen, J.M. Noworolski, J. Logan, N.I. Maluf, J. Brown, C. Storment, W. McCulley and G.T.A. Kovacs, "Silicon Fusion Bonding and Deep Reactive Ion Etching; A New Technology for Microstructures", *Proceedings, Transducers* 95, Stockholm, Sweden, 1995, at pp. 556-559.

Figure 2E:
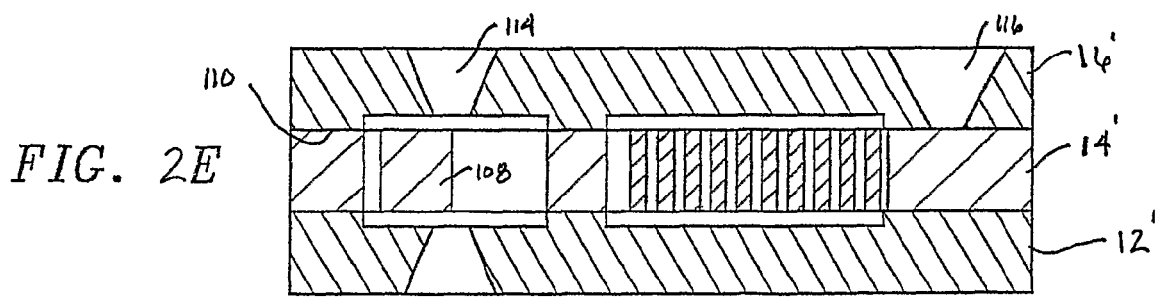

In FIG. 2E, the patterned surface 110 of the third layer 16' is bonded to the second layer 14' by silicon fusion bonding (or direct bonding) process, as described above with reference to FIG. 2C. Although not shown, it is to be understood that prior to the bonding, the third layer 16' can be similarly processed as the first layer 12' to define recessed regions 112, an inlet port 114 and an outlet port 116, as well as thorough-layer contact holes or vias.

Figure 2F:
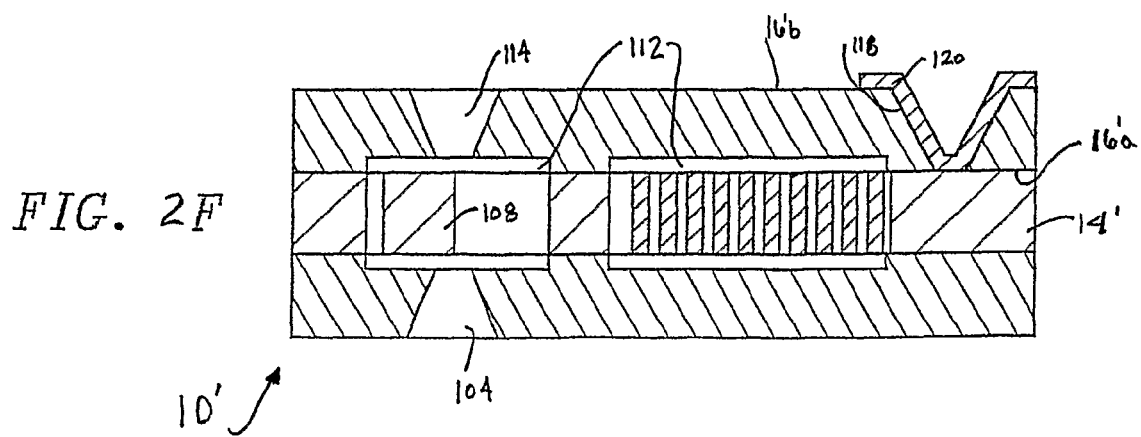

As shown in FIG. 2F, a layer of electrically conductive material 120 such as aluminum is deposited, such as by sputtering, onto the surfaces 118 of the contact holes or vias, the surface of the second layer 14' exposed through the contact hole, and at least a portion of the exterior planar surface 16'b of the third layer 16'. The conductive layer 120 thus forms bond pads to enable electrical contact to the actuator 106. Any necessary circuits or other thin film depositions and patterning can be performed using standard silicon processing techniques on the third layer 16'.

Any number of variations may be easily incorporated into this process. For example, first, second, and/or third layers 12', 16' can be made of other suitable materials instead of silicon. The microvalve 10' may be formed from more than three layers (e.g. 12', 14', 16') or any other micromechanical device may be formed from two or more layers. Furthermore, shallow cavities can be defined in the second layer 14' instead of in or in addition to the first and third layers 12', 16'. Alternatively, each of the layers 12', 14', 16' may be separately processed and then assembled by an aligned bonding step. Other types of bonding may be utilized to bond the wafers together. As is evident, one of ordinary skill in the art can easily make there and numerous other variations to the fabrication process by, for example, merely modifying the layout.

Figure 3:
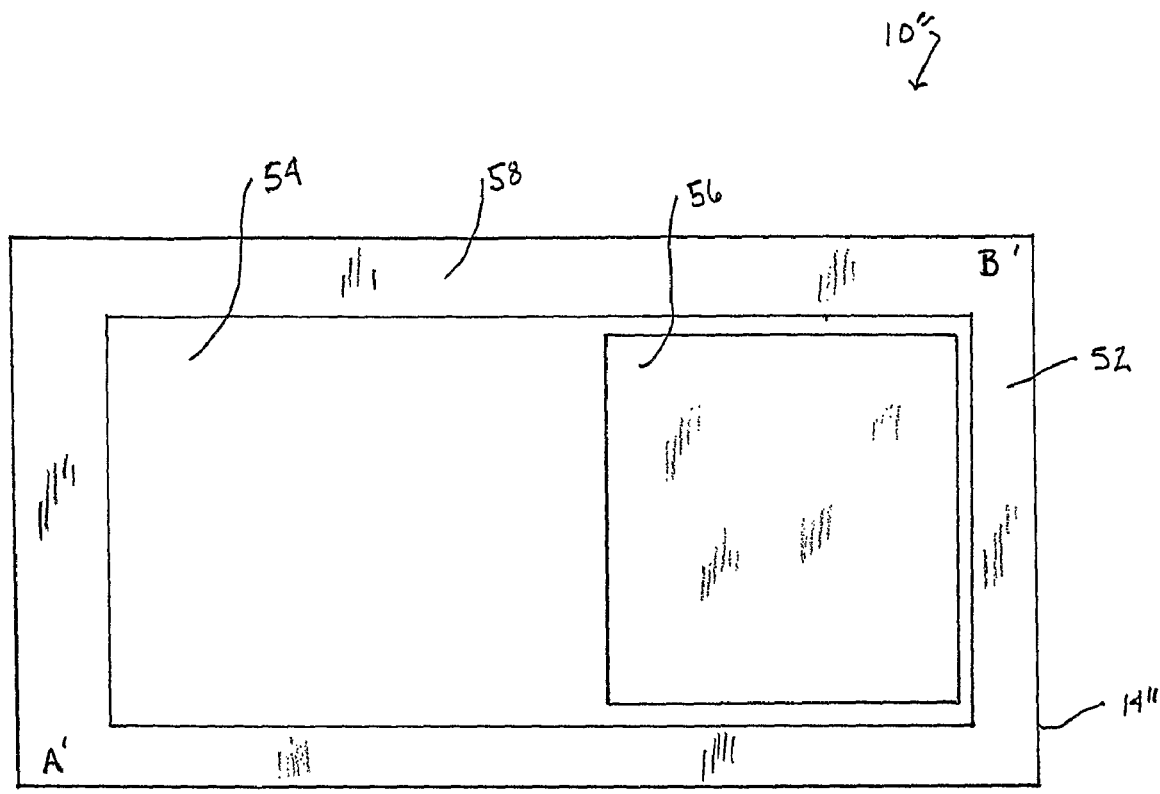
FIG. 3 is an exploded plan view of a first and second layer of a microvalve having a coated portion and a movable portion according to the present invention.
Figure 3:
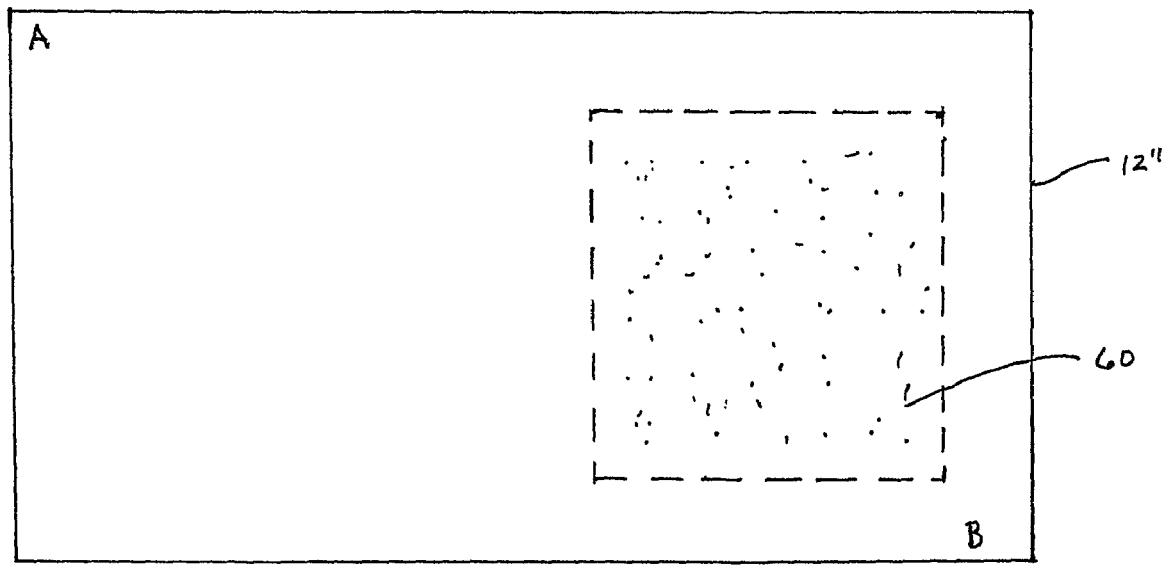
Figure 4A:
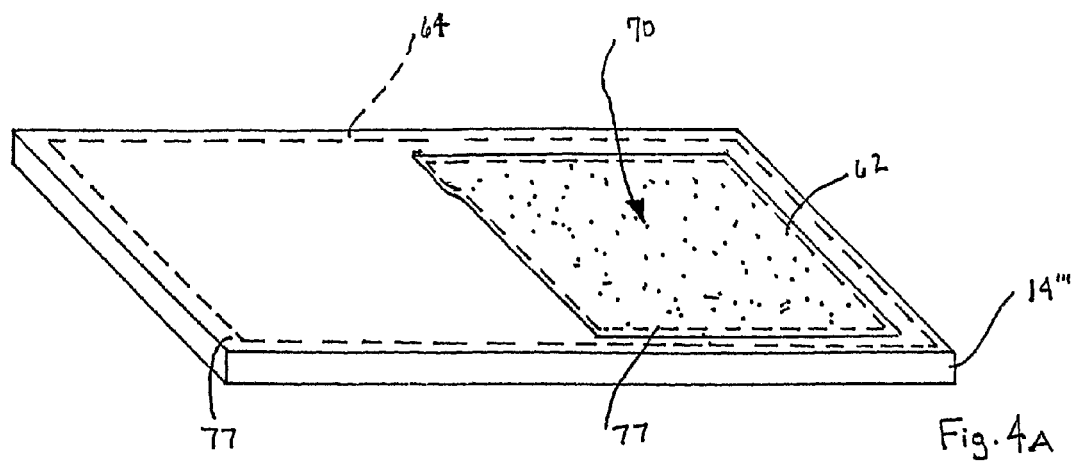
FIGS. 4A-D illustrate a fabrication process flow of forming a microvalve according to the present invention.
Figure 4B:
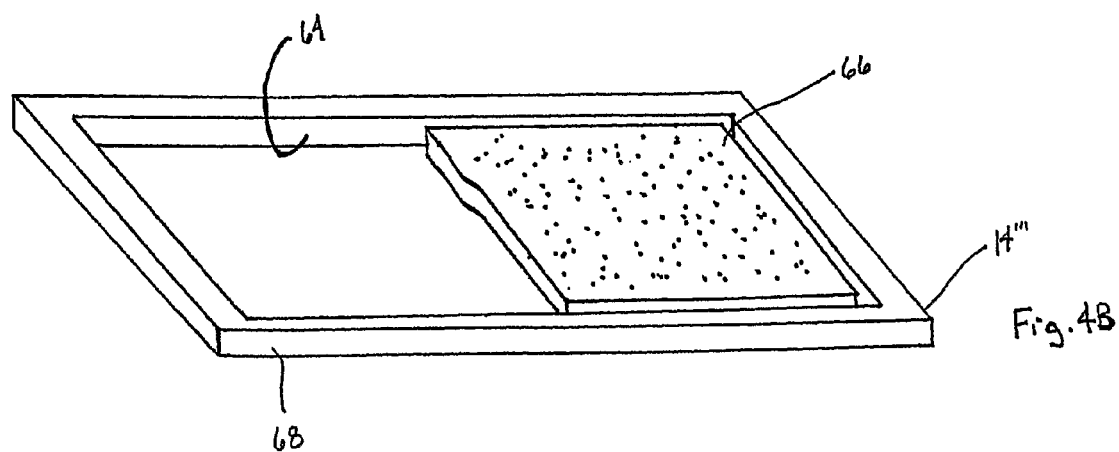
Figure 4C:
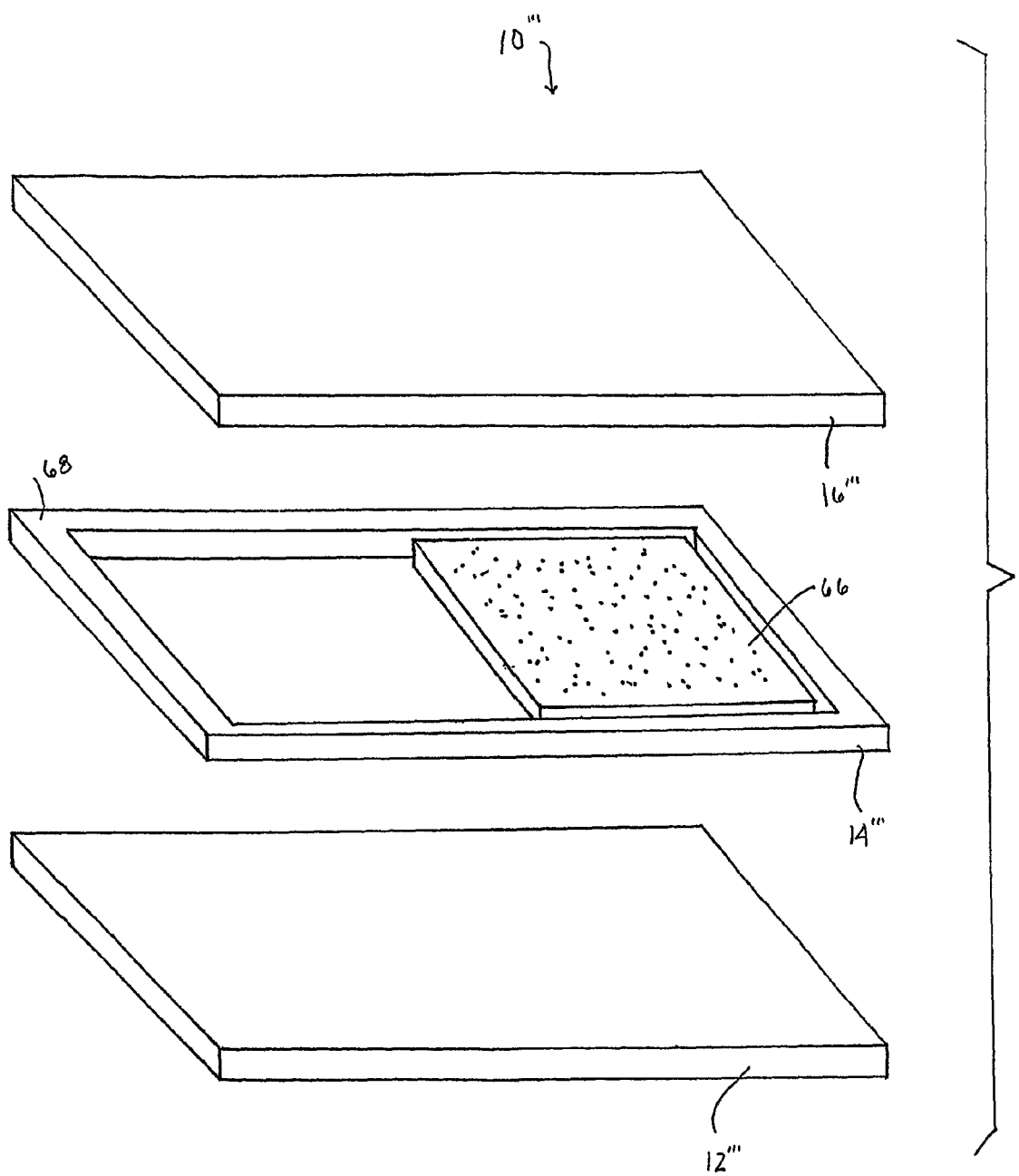
Figure 4D:
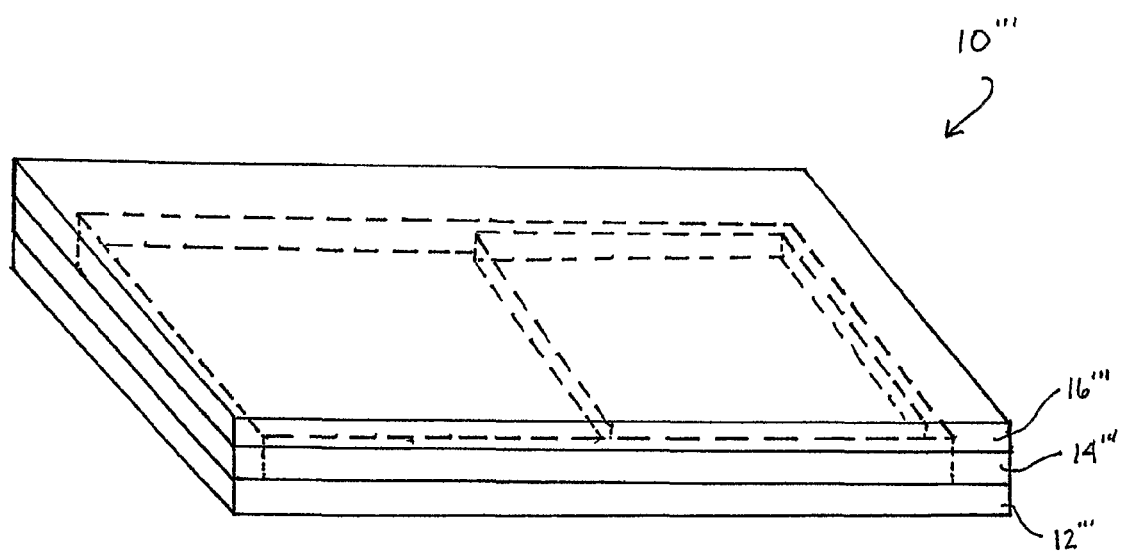

A greatly simplified microvalve device is shown in FIG. 3. The illustrated microvalve assembly 10" includes a first layer 12", and a second layer 14". A third layer (not shown) can be used with the microvalve assembly 10" and is expected to be substantially similar to the first layer 12". As described above, the first layer 12", having a substantially rectangular shape, can have a plurality of openings formed therethrough. The second layer 14", having a substantially rectangular shape and a size that corresponds to the first layer 12" and the third layer, can also include at least one opening formed therethrough, as well as channels (not shown) formed on both the front surface 52 and back surface of the second layer 14". The third layer, having a substantially rectangular shape, and a size that corresponds to the first layer 12" and second layer 14", can also include at least one opening formed therethrough at positions that correspond to the positions of at least some of the openings formed through the second layer 14".

Many microvalve devices (such as that shown in FIG. 1) utilize a plurality of ports 20, 22 formed in one or more of the layers 12, 14, 16 to provide fluid communication through the valve 10 from a source of fluid to a load and reservoir. Many valves, as described above, also include a slidable valve portion that is supported by the body of the second layer for opening and closing the fluid ports. The second layer can also include an actuator that is operably coupled to the valve portion for moving the valve portion. A microvalve portion is positioned by the fluid controlled by the valve portion. The microvalve can include a slider valve that is movably disposed in a cavity formed in the second layer between a first position and a second position. Depending on the valve arrangement, moving the slider valve from the first position to the second position to partially block and unblock the ports for variably restricting fluid flow between the primary ports.

In order to facilitate the movement of the movable components formed in the second layer of the microvalve, the movable portions are not bonded to adjacent layers. To achieve this, it is known to form adjacent layers having recessed portions such that the movable portions of the microvalve do not have an abutting surface which could frictionally resist the motion of the movable portions (as described with respect to the microvalve 10 shown in FIG. 1). Alternatively, the movable components could be formed having a thickness that is less than the thickness of the layer of which it is a part, to provide clearances such that the movable portions do not contact adjacent layers of the microvalve device. It should be appreciated that any combination of recesses and reduced thickness members could be used to accomplish the desired purpose of preventing bonding and frictional engagement of adjacent components.

PCT Patent Publication WO 01/71226, the disclosures of which are incorporated herein by reference in their entirety, teaches that areas of a layer can be recessed to provide selective bonding of portions of the various layers of the microvalve device. It further teaches applying a coating in the recessed area of a layer of the microvalve. The reason for doing so is to prevent leaking between layers of the device. There is no disclosure of the composition of the material to be used as a coating, or what the characteristics of that material should be. In contrast, as will be described below, the present invention describes the use of a coating to provide selective bonding between portions of adjacent layers of a multi-layer microvalve. According to the present invention, the additional steps required to form recesses or to reduce the thickness of the movable portions of the valve (such as can be seen in FIGS. 2A-2F) can be eliminated, or their necessity reduced. Alternatively, the process of the present invention can be used in conjunction with the steps described above.

The process for selective bonding is utilized to selectively create areas that do not bond when performing layer bonding processes. In the preferred embodiment, a coating material such as silicon nitride (materials such as silicon carbide, silicon-ceramic materials, diamond, fluorocarbons, and polymers such as Teflon, are some of the other possible coating materials), indicated generally at 62, is selectively placed on the bonding surface of silicon layers. During subsequent layer bonding processing, those areas covered with the silicon nitride (SiN), or other, coating material 62 will not bond where the coated areas contact the silicon of adjacent layers. The areas where silicon contacts silicon (or silicon dioxide), a bond will result. Thus, the coating material 62 covered contact areas corresponding to the mechanical parts etched in one of the bonded layers meant to translate or rotate relative to the other bonded layers will remain unbonded after the layer bonding process. Other areas, such as structural areas in the bonded layers, are preferably not coated with the coating material 62. Thus, these uncoated areas will be able to bond sufficiently to provide full mechanical strength and sealing between those layers.

Selective bonding can also be accomplished using a process of coating selected areas that are to be bonded and leaving unbonded areas uncoated. In this form of the process, a material such as gold is deposited as a coating in the areas to be bonded. Then the wafers are solder bonded together with bonds only forming where the gold coating is located. Alternatively, other coating layers can be applied to facilitate the bonding operation. For example, silicon, silicon dioxide, glass, metals such as gold, silver, and solder materials, and ceramic materials, are materials that can also be used to promote the bonding process.

As shown in FIG. 3, the first and second layers 12", 14" of a micromachined device 10" is illustrated. Although a greatly simplified micromachined device 10" is illustrated, it can be appreciated that the process of the invention can be used with a micromachined device of any level of complexity, such as those devices substantially described above with respect to FIGS. 1 and 2. In FIG. 3, the first layer 12" of the micromachined device 10" is shown as a substantially rectangular, substantially continuous body. The second layer 14" is shown as a similarly sized, substantially rectangular body with a central portion of the body removed. As described above, the central portion can be removed using any suitable process, such as etching, thereby creating an etched slot 54. Also formed within the etched slot 54 of the body of the second layer 14" is a movable portion 56 of the micromachined device 10". Thus, it is preferred that the edges of the movable portion 56 are not rigidly attached with the outer portion 58 of the second layer 14". The movable portion 56 may, if desired, be resiliently connected to the outer portion by a flexible spring member (not shown) similar to the spring 172 illustrated in U.S. Pat. No. 6,540,203. There can be an actuator portion (not shown) connected with the movable portion 56, as described above. However, any suitable actuation mechanism, can be used. Since the movable portion 56 is not rigidly connected with the second layer 14", the movable portion 56 is able to move relative thereto, and within the etched slot 54. It is anticipated that the third layer can be formed similarly to that of the first layer 12", thus, the movable portion 56 of the second layer 14" will be restrained between the first layer 12" and the third layer.

In the preferred embodiment, an area 60 on the underside of the first layer 12" is coated with the coating material 62, such as was described above. It is anticipated that the third layer can be similarly coated. In order to apply the coating material 62 only to the selected area 60, any suitable masking method can be used. However, the movable portion 56 of the second layer 14" could be recessed relative to the third layer in order to provide another means to prevent bonding between the movable portion 56 of the second layer 14" and the third layer. Similarly, a portion of the third layer could have a recessed portion such that the movable portion 56 of the second layer 14" does not abut the third layer when the bonding process is conducted.

To form the micromachined device 10", once the coating material 62 is applied to the area 60 of the first layer 12", corresponding corners of the first layer 12" and the second layer 14" are overlapped. If a masking device has been used, as described above, the mask could be removed (if so required) prior to overlapping the first layer 12" and the second layer 14". As shown in FIG. 3, the corner A, indicated on the first layer 12", and the corner A', indicated on the second layer 14", are overlapped with each other. Similarly, the corner B, indicated on the first layer, and the corner B', indicated on the second layer 14", are overlapped with each other. Once the layers are positioned in this overlapping manner, a layer bonding process, such as one of those described above, can be used to bond the first and second layers 12", 14" together. It is preferred that the bonding process is a silicon fusion bonding process, although any suitable bonding process can be used. Due to the presence of the coating material 62, the movable portion 56 of the second layer will not bond with the first layer 12". Although it is shown as the area 60 of the first layer 12" being coated with the coating material 62, it can be appreciated that the movable portion 56 could also be coated with the coating material 62, or alternatively, only the movable portion 56 could be so coated.

The area 60 coated with the coating material 62 preferably substantially conforms to the size and shape of the movable portion 56 of the second layer 14". The entire region on the first layer 12" that corresponds in size and shape to the etched slot 54 is not necessarily coated with the coating material 62. Coating the entire area is not required since the movable portion 56 of the second layer 14" is preferably maintained in a single position during the bonding process, and thus, the moveable portion 56 will only remain in contact with the coated portion of the first layer 12" during the bonding process. Upon completion of the bonding process, the movable portion 56 will be able to move within the etched slot 54 without bonding therewith because some of the conditions required for bonding to occur (e.g., elevated temperature for an extended time period) will not be present during the operation of the valve 10". Additionally, the coating material 62, generally, will remain on the surfaces of the coated area 60 after the bonding process is completed. The remaining coating material 62 on the coated area 60 can also assist with the prevention of leaking between the layers of the micromachined device 10".

In the preferred embodiment, the coating material 62 is applied to a thickness of between about 100 Angstroms to about 10 micrometers. The preferred thickness would be between a few hundred Angstroms to a few thousand Angstroms. It can be appreciated that the coating can be applied having any suitable thickness. In order to accommodate the additional thickness of the coating between the layers, a second coating material (not shown) can be applied to the areas surrounding the coating material 62. The second coating material can act to facilitate the bonding process or have no effect on the bonding process. Alternatively, or additionally, the areas that have the coating material 62 applied thereto can be thinned relative to the thickness of the layer being coated so that when the coating material 62 is applied to the desired thickness, the surface of the coating material is substantially flush with the adjacent surface of the layer being coated. However, it should also be appreciated that the coating material 62 can have a thickness that is not significant to the overall thickness of the micromachined device so that a second coating or thinning step is not required prior to bonding the plurality of layers together.

An alternate method for forming a microvalve is illustrated in FIGS. 4A-D. As with FIG. 3 above, several layers of a micromachined device 10''' are illustrated in FIGS. 4A-D. Although a greatly simplified micromachined device 10''' is illustrated, it can be appreciated that the process of the invention can be used with a micromachined device of any level of complexity, such as those devices substantially described above with respect to FIGS. 1 and 2. In this embodiment, a second layer 14''' is provided. The second layer 14''' of the micromachined device 10''' is shown as a substantially rectangular, substantially continuous body. However prior to etching a portion of the second layer 14''', selected areas of the second layer 14''' are coated with the coating material 62 described above. In order to apply the coating material 62 only to a selected area 70, any suitable masking method can be used. It is preferred that the coating 62 is applied to both upper and lower surfaces (as viewed in FIGS. 4A-D) of the second layer 14''' in an area 70 that corresponds to the desired shape and size of the movable portion 66 or portions of the second layer 14'''. Once the desired area 70 is coated, a central portion (slot 64) of the second layer 14''' can be etched. The inner and outer boundaries of the area to be etched through the second layer 14''' to form the slot 64 are shown with dashed lines in FIG. 4A. These portions that are not to be etched can be masked or otherwise protected so as to prevent those portions from being affected by the etching process.

As was described above, in the second layer 14''' the central portion can be removed using any suitable process, such as etching, thereby creating an etched slot 64. Also formed within the etched slot 64 of the body of the second layer 14''' is the movable portion 66 of the micromachined device 10'''. Thus, it is preferred that the edges of the movable portion 66 are not rigidly attached with the outer portion 68 of the second layer 14'''. The movable portion 66 may, if desired, be resiliently connected to the outer portion by a flexible spring member (not shown) similar to the spring 172 illustrated in U.S. Pat. No. 6,540,203. There can be an actuator portion (not shown) connected with the movable portion 66, as described above. However, any suitable actuation mechanism, can be used. Since the movable portion 66 is not rigidly connected with the second layer 14''', the movable portion 66 is able to move relative thereto, and within the etched slot 64.

It is anticipated that a first layer 12''' and a third layer 16''' can be formed similarly to that of any of the layers described above. The next step of the method of forming the micromachined device 10''' includes positioning the second layer 14''' between the first layer 12''' and third layer 16'''. Thus, the movable portion 66 of the second layer 14''' will be restrained between the first layer 12''' and the third layer 16'''. Once the layers are positioned in this overlapping manner, a layer bonding process, such as one of those described above, can be used to bond the layers 12''', 14''', 16''' together. It is preferred that the bonding process is a silicon bonding process, although any suitable bonding process can be used. Due to the presence of the coating material 62, the movable portion 66 of the second layer 14''' will not bond with the first layer 12''' or third layer 16'''.

The area 70 coated with the coating material 62 preferably substantially conforms to the size and shape of the movable portion 66 of the second layer 14'''. Regions on the first layer 12''' and third layer 16''' that correspond in size and shape to the etched slot 64 are not necessarily coated with the coating material 62. Coating the entire area is not required since the movable portion 66 of the second layer 14''' is preferably maintained in a single position during the bonding process, and thus, the moveable portion 66 will only remain in contact with the coated portion of the first layer 12''' and third layer 16''' during the bonding process. Upon completion of the bonding process, the movable portion 66 will be able to move within the etched slot 64 without bonding therewith because some of the conditions required for bonding to occur (e.g., elevated temperature for an extended time period) will not be present during the operation of the valve 10'''. Additionally, the coating material 62, generally, will remain on the surfaces of the coated area 70 after the bonding process is completed. The remaining coating material 62 on the coated area 70 can also assist with the prevention of leakage past the movable portion 66 between the layers of the micromachined device 10'''.

It should be appreciated that although the invention has been described generally as coating an area of a layer or layers to prevent bonding between the coated area and adjacent layers, the invention can also apply to embodiments where only the areas to be bonded are coated with a coating material and areas not to be bonded are left uncoated.

Figure 5:
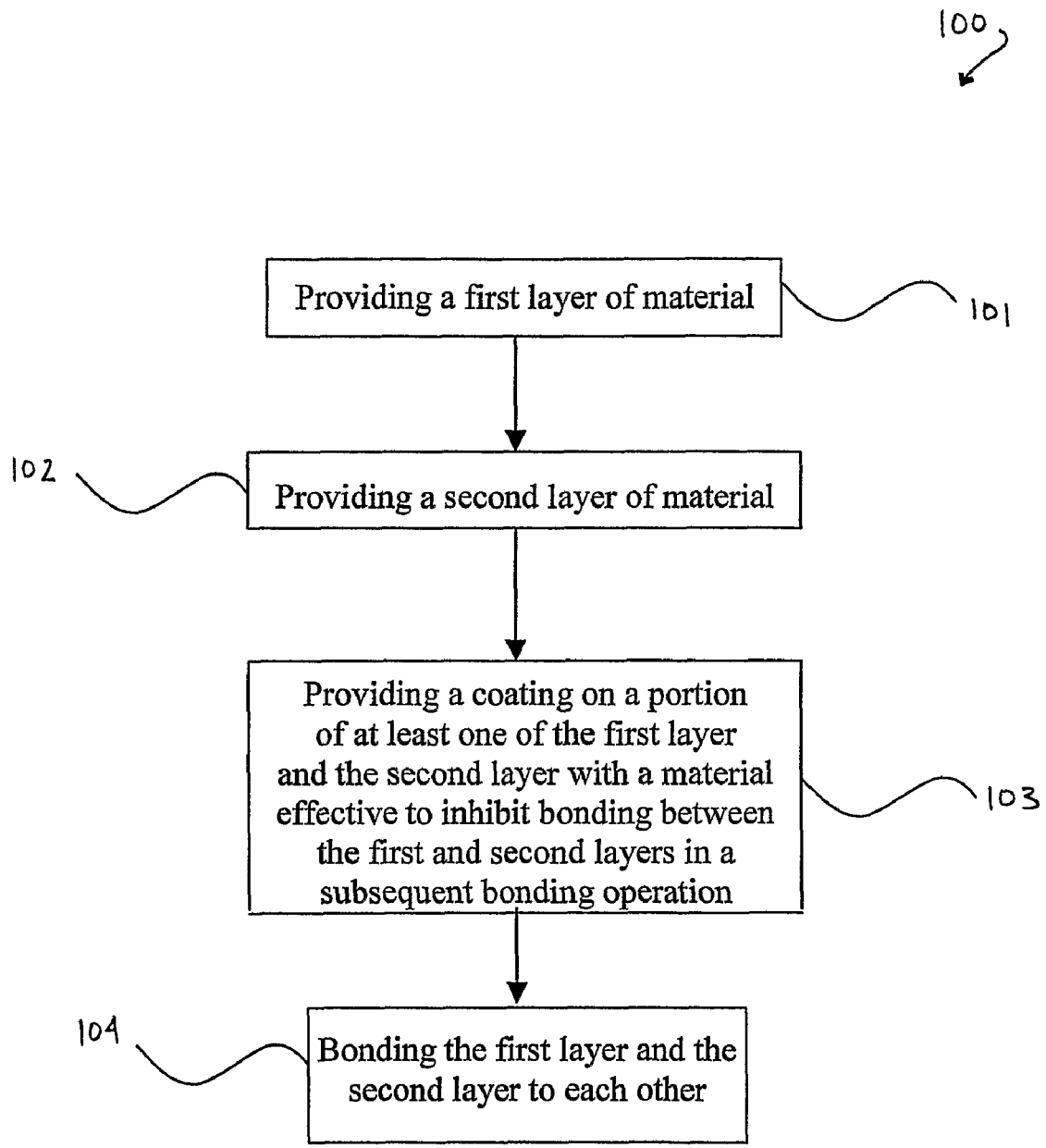
FIGS. 5-10 depict flow diagrams of alternate embodiments of fabrication processes for forming a microvalve according to the present invention.

Illustrated in FIG. 5 is a flow diagram, indicated generally at 100, listing the steps of forming a microvalve in one embodiment of the present invention. As described above, a first layer of material is provided at a first step 101. A second layer of material is provided at a second step 102. In a third step 103, a coating is provided on a portion of at least one of the first layer and the second layer. The coating is effective to prevent the portion from bonding with the other of the second layer and the first layer. In a fourth step 104, the first and second layers are bonded to each other.

Figure 6:
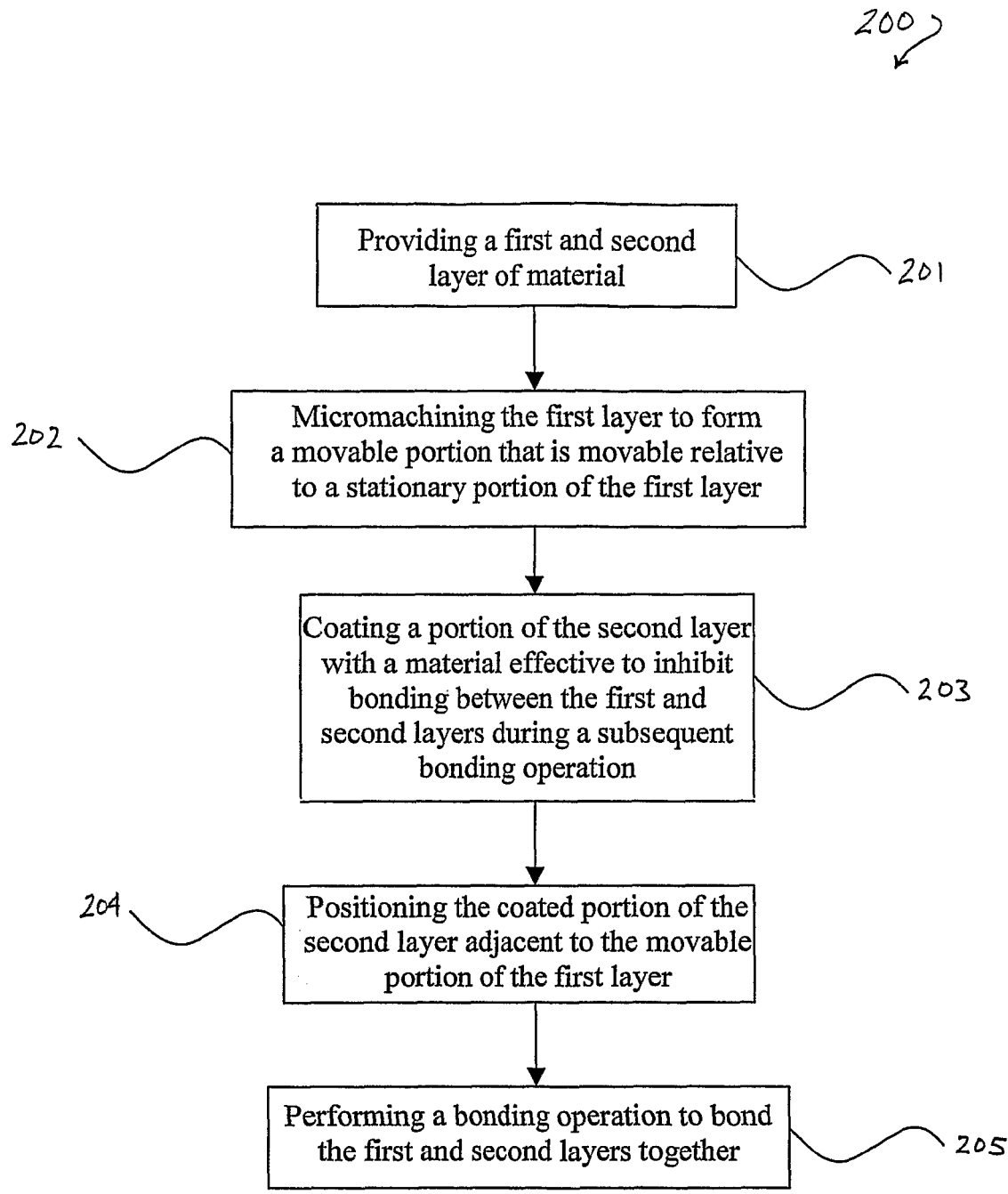

Illustrated in FIG. 6 is a flow diagram, indicated generally at 200, listing the steps of forming a microvalve in another embodiment of the present invention. In a first step 201, a first and second layer of material are provided. In a second step 202, a first layer is micromachined to form a portion that is movable relative to a stationary portion of the first layer. In a third step 203, a portion of a second layer is coated with a material that is effective to inhibit bonding between the first and second layers during a subsequent bonding operation. In a fourth step 204, the coated portion of the second layer is positioned adjacent the movable portion of the first layer. In a fifth step 205, a bonding operation is performed to bond the plurality of layers together.

Figure 7:
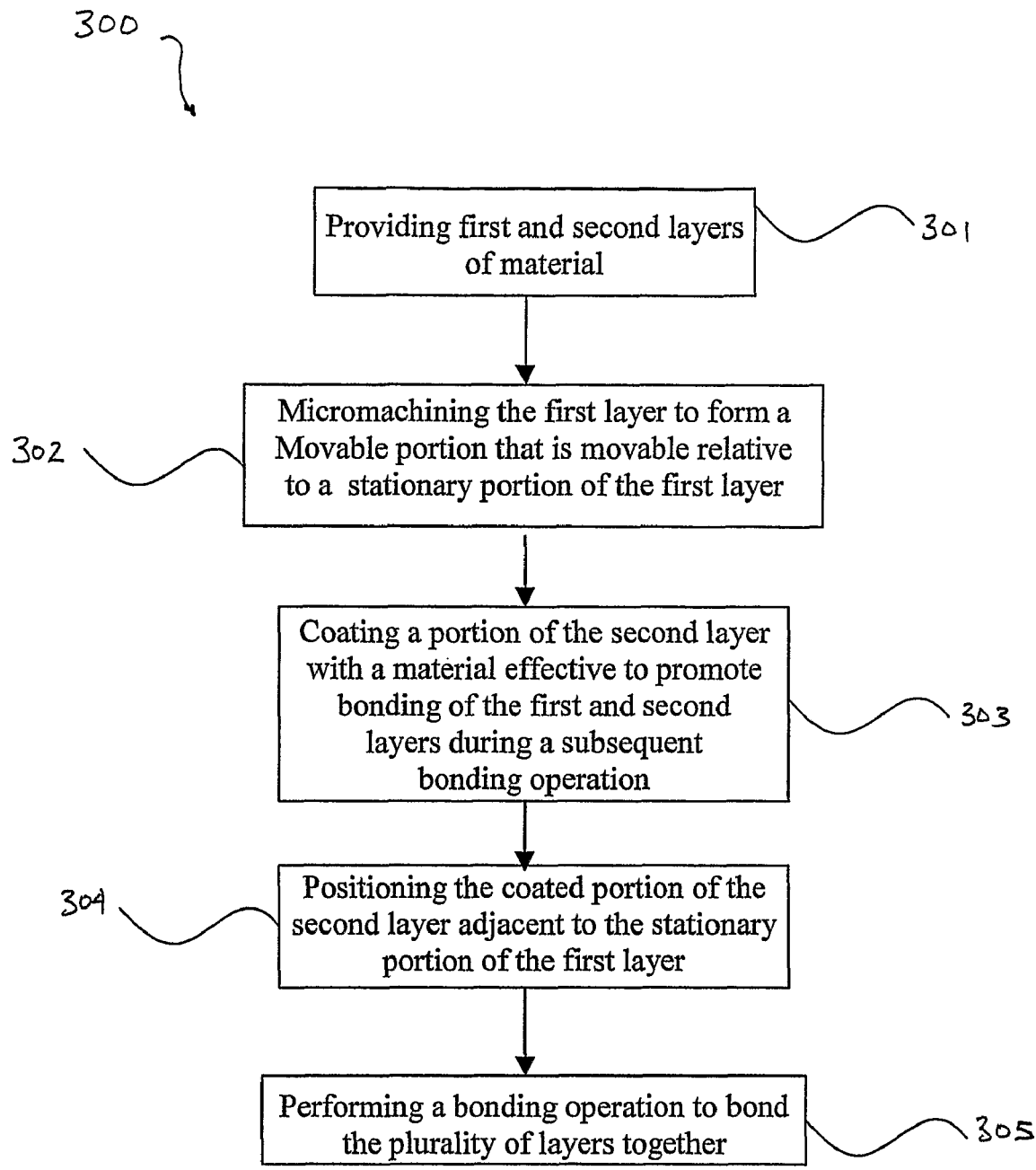

Illustrated in FIG. 7 is a flow diagram, indicated generally at 300, listing the steps of forming a microvalve in another embodiment of the present invention. In a first step 301, a first and second layer of material are provided. In a second step 302, a first layer is micromachined to form a portion that is movable relative to a stationary portion of the first layer. In a third step 303, a portion of a second layer is coated with a material that is effective to promote bonding of the first and second layers during a subsequent bonding operation. In a fourth step 304, the coated portion of the second layer is positioned adjacent the stationary portion of the first layer. In a fifth step 305, a bonding operation is performed to bond the plurality of layers together.

Figure 8:
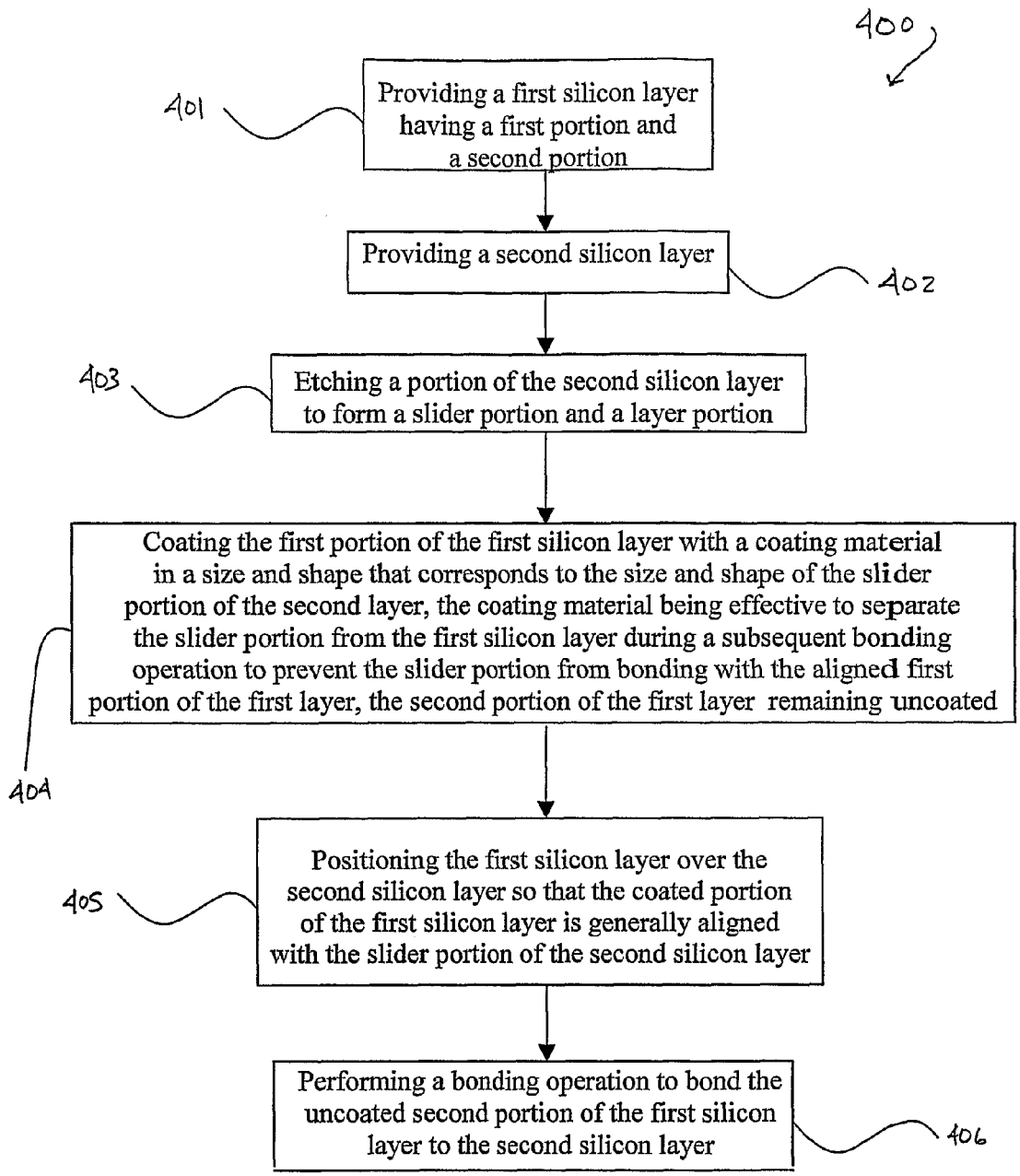

Illustrated in FIG. 8 is a flow diagram, indicated generally at 400, listing the steps of forming a microvalve in another embodiment of the present invention. In a first step 401, a first silicon layer is provided that has a first portion and a second portion. In a second step 402, a second silicon layer is provided. In a third step 403, a portion of the second silicon layer is etched to form a slider portion and a layer portion. In a fourth step 404, the first portion of the first silicon layer is coated with a coating material in a size and shape that corresponds to the size and shape of the slider portion of the second layer. The coating material is effective to separate the slider portion from the first silicon layer during a subsequent bonding operation to prevent the slider portion from bonding with the aligned first portion of the first layer. The second portion of the first layer remains uncoated. In a fifth step 405, the first silicon layer is positioned over the second silicon layer so that the coated portion of the first layer is substantially aligned with the slider portion of the second silicon layer. In a sixth step 406, a bonding operation is performed to bond the first silicon layer to the second silicon layer.

Figure 9:
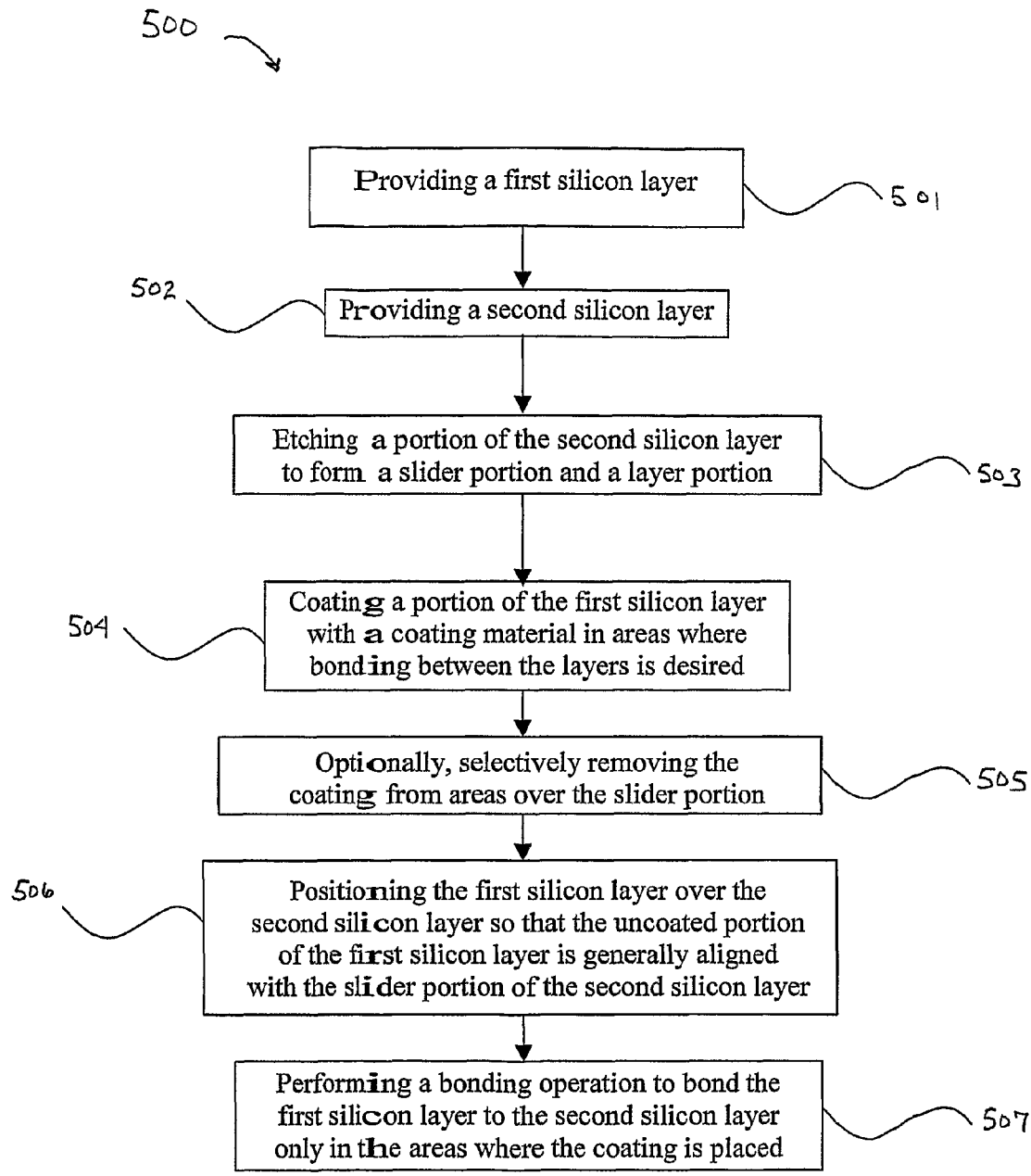

Illustrated in FIG. 9, is a flow diagram, indicated generally at 500, listing the steps of forming a microvalve in another embodiment of the present invention. In a first step 501, a first silicon layer is provided. In a second step 502, a second silicon layer is provided. In a third step 503, a portion of the second silicon layer is etched to form a slider portion and a layer portion. In a fourth step 504, a portion of the first silicon layer is coated with a coating material in areas where bonding between the layers is desired. In an optional fifth step 505, the coating is selectively removed from areas over the slider portion. In a sixth step 506, the first silicon layer is positioned over the second silicon layer so that the uncoated portion of the first layer is substantially aligned with the slider portion of the second silicon layer. In a seventh layer 507, a bonding operation is performed to bond the first silicon layer to the second silicon layer only in areas where the coating is placed.

Figure 10:
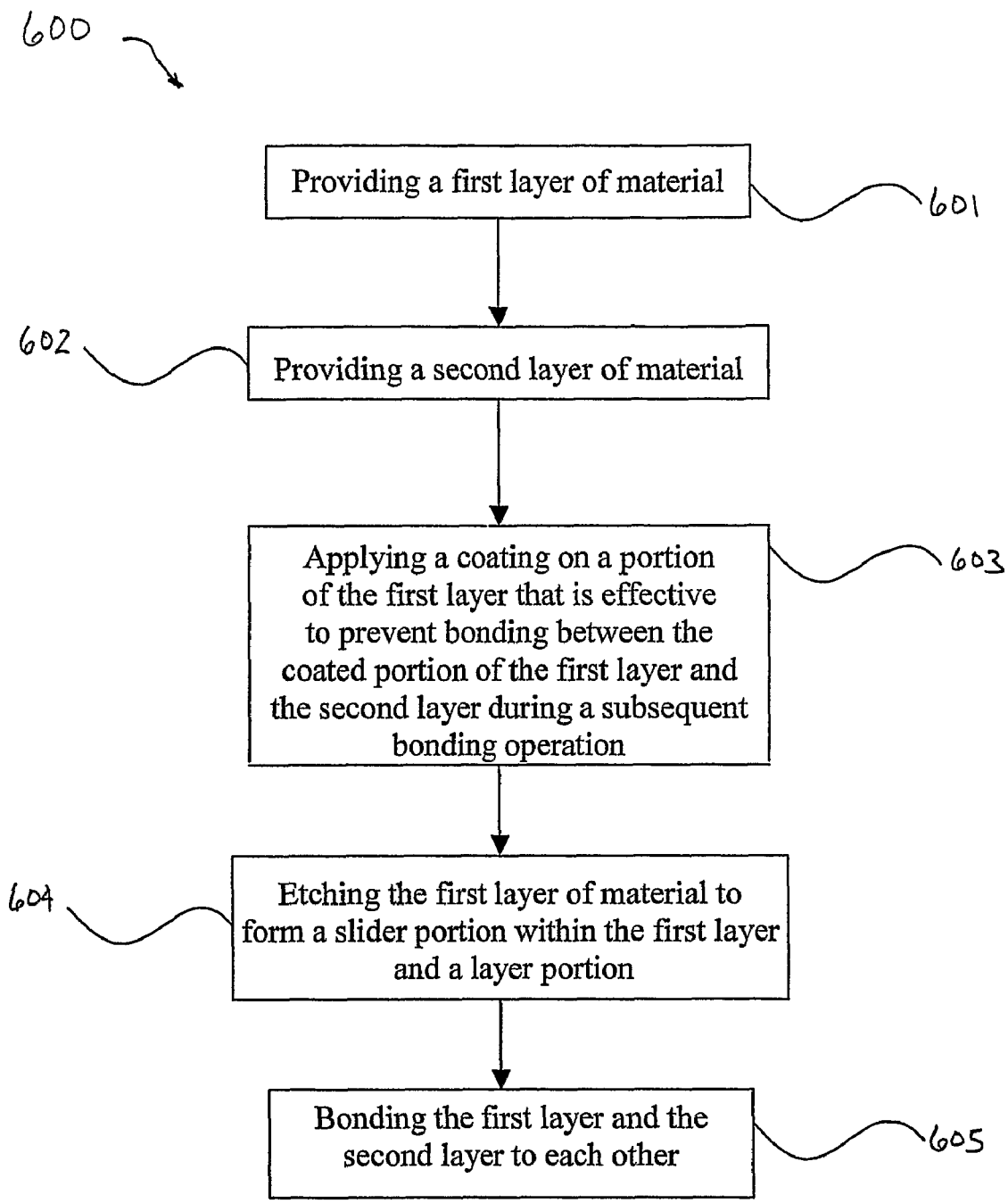

Illustrated in FIG. 10, is a flow diagram, indicated generally at 600, listing the steps of forming a microvalve in another embodiment of the present invention. In a first step 601, a first layer of material is provided. In a second step 602, a second layer of material is provided. In a third step 603, a coating is provided on a portion of the first layer. The coating is effective to prevent bonding between the coated portion of the first layer and the second layer during a subsequent bonding operation. In a fourth step 604, the first layer of material is etched to form a slider portion within the first layer, and a layer portion. The slider portion is movable relative to the layer portion. The slider portion also corresponds to the size and shape of the coating portion. In a fifth step 605, the first layer and the second layer are bonded to each other.

The principle and mode of operation of this invention have been described in its preferred embodiments. However, it should be noted that this invention may be practiced otherwise than as specifically illustrated and described without departing from its scope.

What is claimed is:

1. A method of fabricating a micromachined device by selectively bonding a plurality of layers of material, comprising: a) providing a first layer of material; b) providing a second layer of material; c) providing a coating on a first portion of the first layer; and d) bonding the first layer and the second layer to each other to form a micromachined device, the coating being effective to prevent the coated portion from bonding with the second layer.

2. The method defined in claim 1 wherein the coating material is selected from the group consisting of silicon nitride, silicon carbide, polymer film, fluorocarbon film, and a silicon-ceramic material.

3. The method defined in claim 1 wherein the coating material is silicon nitride.

4. The method defined in claim 1 further comprising, following step a), the step: a1) thinning the first portion of the first layer to reduce the thickness thereof such that when the coating material is applied to the portion in step c), an upper surface of the coating is substantially flush with an adjacent upper surface of the first layer.

5. The method defined in claim 1, in step d), wherein a fusion bonding process is used to bond the first layer to the second layer.

6. The method defined in claim 1, wherein in step d), a direct bonding process is used to bond the first layer to the second layer.

7. The method defined in claim 1 farther comprising, prior to step c), a step: c') masking a second portion of the first layer wherein the second portion comprises an area of the first layer that is not to be coated by the coating.

8. The method defined in claim 1 wherein the coating is applied with a thickness of 10 Angstroms to 100 micrometers.

9. The method defined in claim 1 wherein the second layer has a plurality of mechanical parts formed in, the mechanical parts being movable relative to a stationary portion of the second layer.

10. The method defined in claim 9 wherein, in step c), the coating is provided on the first layer at a position that corresponds to the position of the mechanical parts formed in the second layer, such that when the first layer is positioned adjacent the second layer, the coating portion is adjacent the mechanical parts.

11. The method defined in claim 10 further comprising, following step d), the steps of: e) providing a third layer of material; f) providing a coating on a first portion of the third layer; and g) bonding the third layer to the second layer, wherein the coating on the third layer is effective to prevent the coated portion from bonding with the second layer.

12. The method defined in claim 11 wherein, in step f), the coating is provided on the third layer at a position that corresponds to the position of the mechanical parts formed on the second layer, such that when the third layer is positioned adjacent the second layer, the coating portion is adjacent the mechanical parts.

13. A method of forming a microvalve comprising:
  a) providing a plurality of layers of material, including at least a first layer and a second layer, wherein at least the first layer includes a movable microvalve portion that is movable relative to a stationary portion of the first layer;
  b) coating a portion of the second layer;
  c) positioning the coated portion of the second layer adjacent to the movable microvalve portion of the first layer; and
  d) performing a bonding operation to bond the plurality of layers together, wherein the coating prevents the movable microvalve portion of the first layer from bonding with the coated portion of the second layer while an uncoated portion of the second layer bonds to the stationary portion of the first layer.

14. The method defined in claim 13 wherein the coating material is selected from the group consisting of silicon nitride, silicon carbide, polymer film, fluorocarbon film, and a silicon-ceramic material.

15. The method defined in claim 13 wherein the coating material is silicon nitride.

16. The method defined in claim 13 further comprising, following step a), the step: a1) thinning the first portion of the second layer to reduce the thickness thereof such that when the coating material is applied to the portion in step b), an upper surface of the coating is substantially flush with an adjacent surface of the second layer.

17. The method defined in claim 13 wherein, in step d), a fusion bonding process is used to bond the first layer to the second layer.

18. The method defined in claim 13 wherein, in a step d), a direct bonding process is used to bond the first layer to the second layer.

19. The method defined in claim 13 further comprising, before step b), a step: b') masking a second portion of the second layer wherein the second portion comprises an area of the second layer that is not to be coated by the coating when the coating is applied to the rest of the second layer in step b).

20. The method defined in claim 13 wherein the coating is applied with a thickness of 10 Angstroms to 100 micrometers.

21. The method defined in claim 13 wherein the plurality of layers includes a third layer of material, and further comprising, following step d), the steps of:
   e) providing a coating on a portion of the third layer; and
   f) bonding the third layer to the first layer, wherein the coating on the third layer is effective to prevent the movable microvalve portion of the first layer from bonding with the coated portion of the third layer while an uncoated portion of the third layer bonds to the stationary portion of the first layer.

22. The method defined in claim 21, during step e), wherein only a portion of the third layer is coated such that the coating is provided on the third layer at a position that corresponds to the position of the movable microvalve portion of the first layer and a portion of the third layer remains uncoated, and further including, after step e), the step: e1) positioning the third layer adjacent the first layer such that the coating portion is adjacent the movable microvalve portion of the first layer.

23. A method of selectively bonding a plurality of layers of material to form a micromachined device, comprising:
   a) providing a first layer of material;
   b) providing a second layer of material;
   c) providing a coating on a portion of the first layer of material;
   d) etching the first layer of material to form a portion of a micromachined device including a slider portion within the first layer and a fixed portion within the first layer, wherein the slider portion is movable relative to the fixed portion, and the slider portion substantially corresponds to the size and shape of the coated portion; and
   e) bonding the first layer and the second layer to each other, the coating being effective to prevent the slider portion of the first layer from bonding with the second layer.

24. The method defined in claim 23 wherein the coating material is selected from the group consisting of silicon nitride, silicon carbide, polymer film, fluorocarbon film, and a silicon-ceramic material.

25. The method defined in claim 23 wherein the coating is applied with a thickness of 10 Angstroms to 100 micrometers.

* * * * *